United States Patent
Tsorng et al.

(10) Patent No.: US 7,577,000 B2
(45) Date of Patent: Aug. 18, 2009

(54) RISER CARD MODULE

(75) Inventors: Yaw-Tzorng Tsorng, Tao Yuan Shien (TW); Chen-Sheng Tang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 130 days.

(21) Appl. No.: 11/905,018

(22) Filed: Sep. 27, 2007

(65) Prior Publication Data

US 2008/0165487 A1 Jul. 10, 2008

(30) Foreign Application Priority Data

Jan. 2, 2007 (TW) .............................. 96200420 U

(51) Int. Cl.
*H05K 7/14* (2006.01)
*H05K 7/18* (2006.01)

(52) U.S. Cl. ...................................... 361/802; 361/801

(58) Field of Classification Search ................ 361/600, 361/679, 688–690, 694, 737, 748, 784–785, 361/752–754, 796, 801–803, 807, 810, 816, 361/818; 174/15.1, 16; 439/59, 61, 74, 157, 439/625–626

See application file for complete search history.

(56) References Cited

U.S. PATENT DOCUMENTS

| 6,169,662 | B1 * | 1/2001 | Clark et al. | 361/754 |
| 6,529,386 | B2 * | 3/2003 | Boe | 361/801 |
| 6,655,976 | B1 * | 12/2003 | Shipe et al. | 439/328 |
| 6,687,134 | B2 * | 2/2004 | Vinson et al. | 361/798 |
| 2008/0165488 | A1 * | 7/2008 | Tsorng et al. | 361/683 |

* cited by examiner

*Primary Examiner*—Hung S Bui
(74) *Attorney, Agent, or Firm*—Rabin & Berdo, PC

(57) ABSTRACT

A riser card module is installed in a slot of a main board. The slot has a first hook member arranged on the side of the slot. The riser card module includes a riser and a mounting rack. The riser card is inserted in the slot vertically. The mounting rack is connected to the riser card. The mounting rack includes an upright board and a sliding device. The upright board mounts the riser card in parallel and includes a first sliding member. The sliding device has a second sliding member and a hook member. The second sliding member is arranged in respect of the first sliding member so that the sliding device is slid with respect to the upright board in a direction parallel with the main board. The second hook member is hooked to the first hook member.

13 Claims, 5 Drawing Sheets

RISER CARD MODULE

RELATED APPLICATIONS

The application claims priority to Taiwan Application Serial Number 96200420, filed Jan. 9, 2007, which is herein incorporated by reference.

BACKGROUND

1. Field of Invention

The present invention relates to an inserted card structure. More particularly, the present invention relates to a riser card module for a computer system.

2. Description of Related Art

In order to increase the capacity of the server rack to increase the computing speed, every server module must reduce the volume. Therefore, the server module is compact and small.

However, the common expansion card could not install in the slot of the main board vertically due to the small side of the server module. Hence, the riser card is vertically installed in the slot of the main board first, then the common expansion card is installed in the expansion slot of the riser card. Therefore, the common expansion card is parallel with the main board.

Moreover, the riser card is mounted on the mounting rack usually. But the riser card module composed of the riser card and the mounting rack is not easy to dismount due to the small space of the server module. Hence, the room for upgrade of the server module is reduced. In addition, there is no mounting structure between the riser card module and the main board, the riser card module structure is unbalance when the expansion card is installed in the expansion slot of the riser card.

Therefore, it is desirable to reduce the difficult to dismount the riser card module from the main board and increase the stability of the riser card module structure.

SUMMARY

The current embodiment discloses a riser card module installed in a slot of a main board. The slot has a first hook member arranged on the side of the slot. The riser module includes a riser card and a mounting rack. The riser card is inserted in the slot vertically. The mounting rack is connected to the riser card. The mounting rack includes an upright board and a sliding device. The upright board mounts the riser card in parallel, and has a first sliding member. The sliding device includes a second sliding member and a second hook member. The second sliding member is arranged in respect of the first sliding member so that the sliding device slides with respect to the upright board in a direction parallel with the main board. The second hook member is hooked to the first hook member, when the sliding device slides, the second hook member disengages from the first hook member.

Moreover, the mounting rack further includes a top board and a flexible force member. The top board is vertically connected to the side of the upright board opposite to the main board. One side of the flexible force member is connected to the top board, and the other side of the flexible force member is connected to the sliding device.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
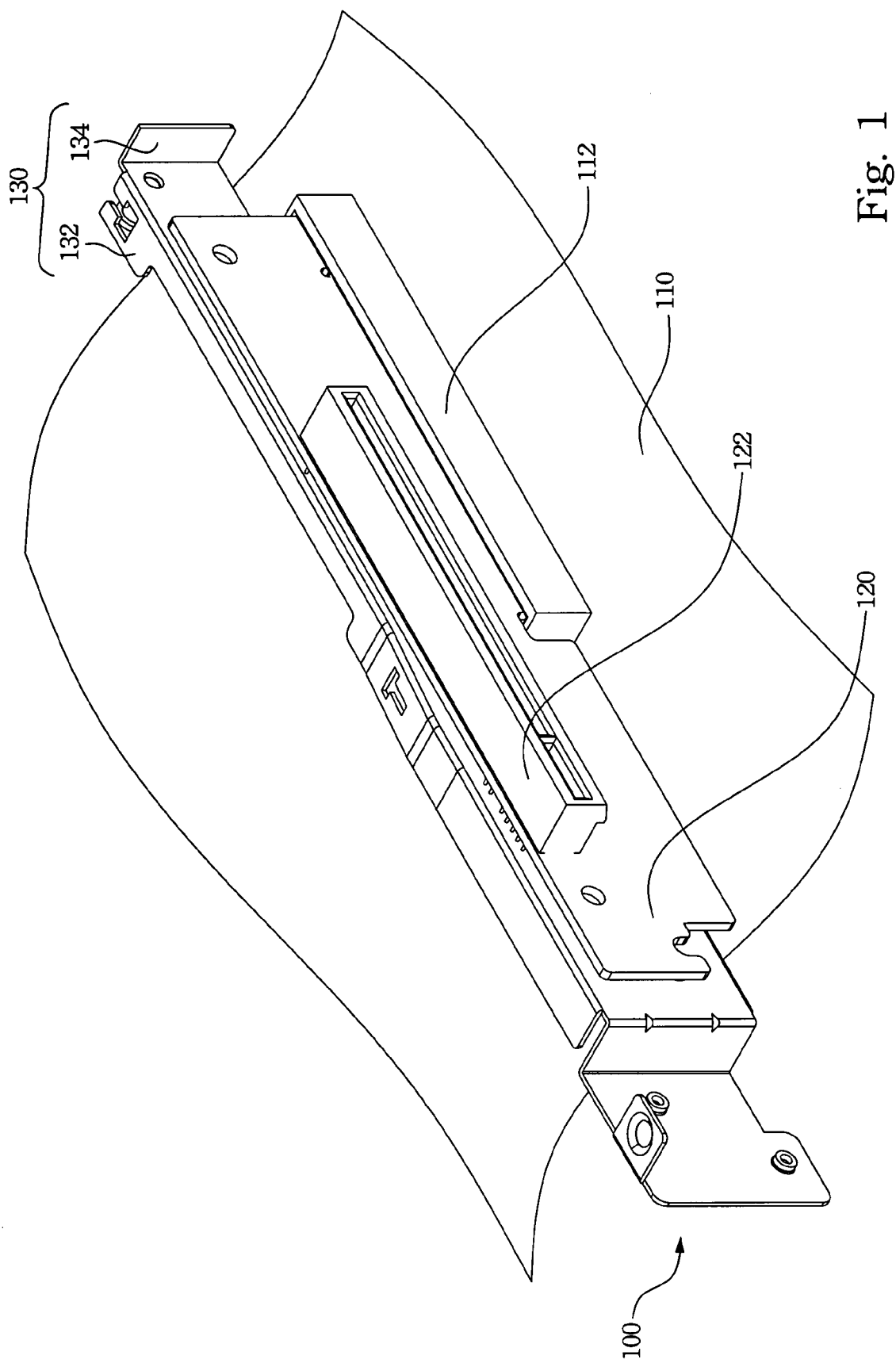
FIG. 1 depicts the riser card module of the first embodiment installed on the main board.

Reference will now be made in detail to the present preferred embodiments of the invention, examples of which are illustrated in the accompanying drawings. Wherever possible, the same reference numbers are used in the drawings and the description to refer to the same or like parts.

The embodiments of the present invention describe a riser card module included a sliding device. The sliding device hooks to the hooking member arranged on the slot to increase the stability of the riser card module structure. Moreover, the riser card module includes a flexible force member connected to the sliding device to control the movement of the sliding device. When the flexible force member is pulled, the sliding device disengages from the hooking device arranged on the slot then the riser module is dismounted from the server module easily. The following describes some embodiments of the invention. The same elements in the different figures and not described in the text are not labeled.

First Embodiment

Please refer to FIG. 1. This figure depicts the riser card module 100 of the first embodiment installed on the main board 110. The riser card module 100 is installed on the slot 112 of the main board 110. The riser card module 100 includes a riser card 120 and a mounting rack 130. The riser card 120 is inserted in the slot 112 vertically. Moreover, the riser card 120 includes a expansion slot 112 for installing a expansion card (not showing in the figure) then the expansion card could install on the main board in parallel.

The mounting rack 130 includes an upright board 134 mounting the riser card in parallel. The mounting rack 130 further includes a top board 132 vertically connected to the side of the upright board 134 opposite to the main board 110.

Figure 2A:
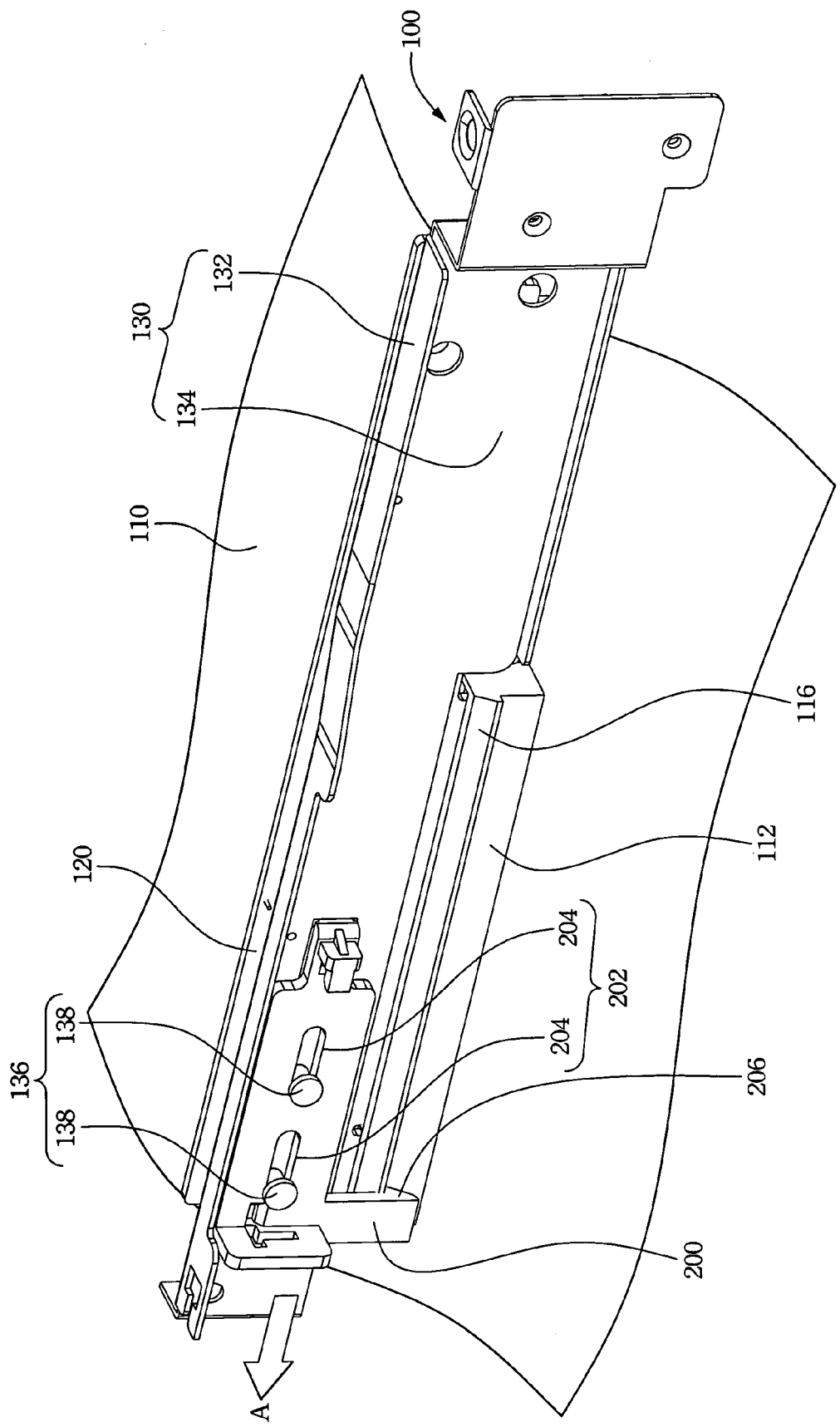
FIG. 2A depicts the riser card module of the first embodiment installed on the main board at another view angle.
Figure 2B:
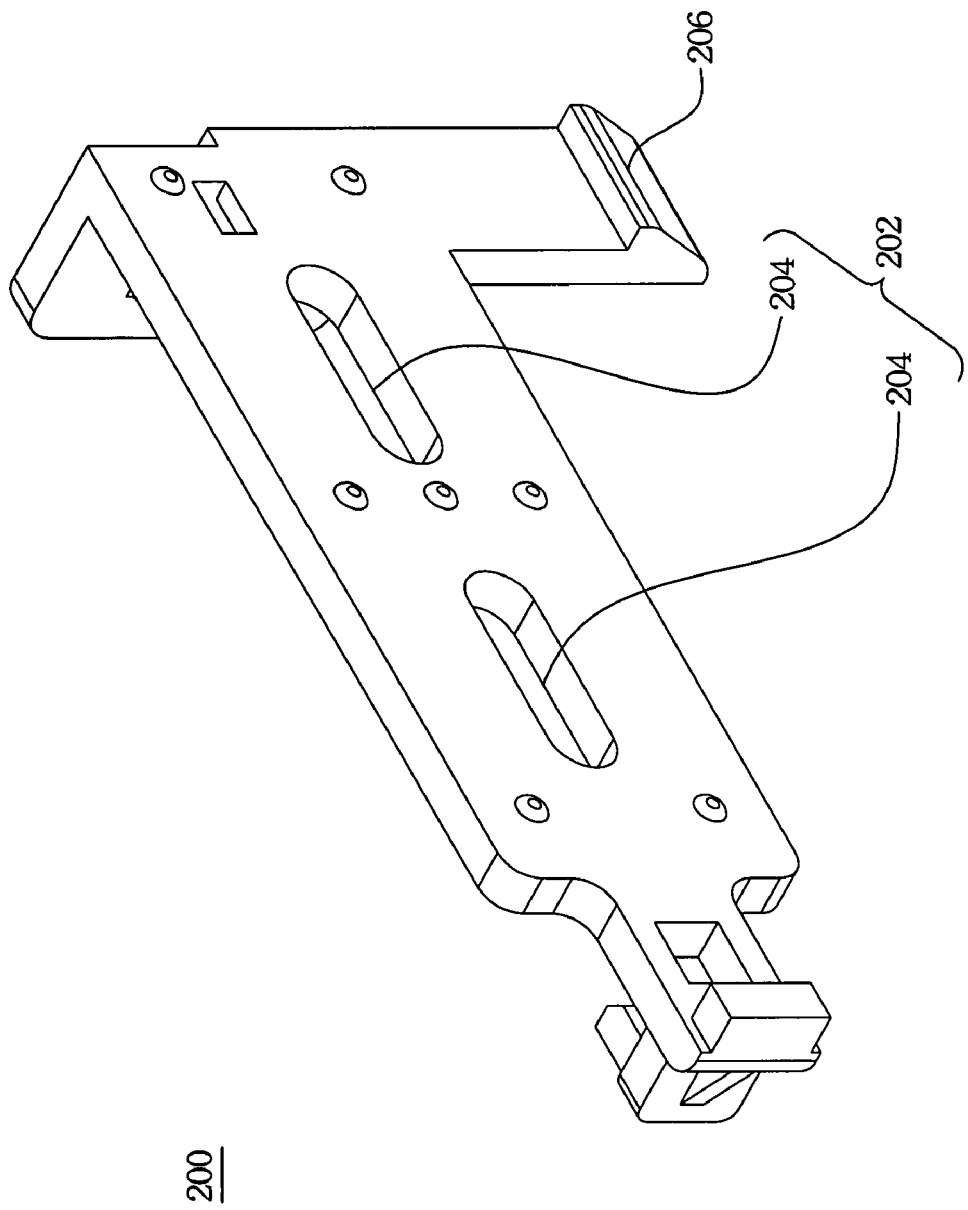
FIG. 2B depicts the sliding device of the first embodiment.

In order to describe the operation in detail, please refer to FIG. 2A and FIG. 2B together. FIG. 2A depicts the riser card module 100 of the first embodiment at another view angle. FIG. 2B depicts the sliding device 200. In addition to the top board 132 and the upright board 134, the mounting rack 130 further includes a sliding device 200. Moreover, the slot 112 includes a first hook member 116 arranged on the side of the slot. The upright board 134 includes a first sliding member 136. The sliding device 200 includes a second sliding member 202 and a second hook member 206.

The second sliding member 202 is arranged in respect of the first sliding member 136 so that the sliding device 200 can slide with respect to the upright board 134 in a direction parallel with the main board 110 (that is the direction pointed by the arrow A). The second hook member 206 is hooked to the first hook member 116 to increase the stability of the riser card module 100. When the sliding device 200 slides, the second hook member 206 disengages from the first hook member 116. Therefore, the riser card module 100 can be dismounted from the slot 112.

In this embodiment, the first sliding member 136 is a guide pillar 138, the second sliding member 202 is a guide opening 204. Due to the arrangement of the guide opening 204 and the guide pillar 138, the sliding device 200 can move along the direction formed by the guide opening 204. Moreover, the second hook member 206 is hooked on the first hook member 116 for increasing the stability of the riser card module 100.

Second Embodiment

Figure 3:
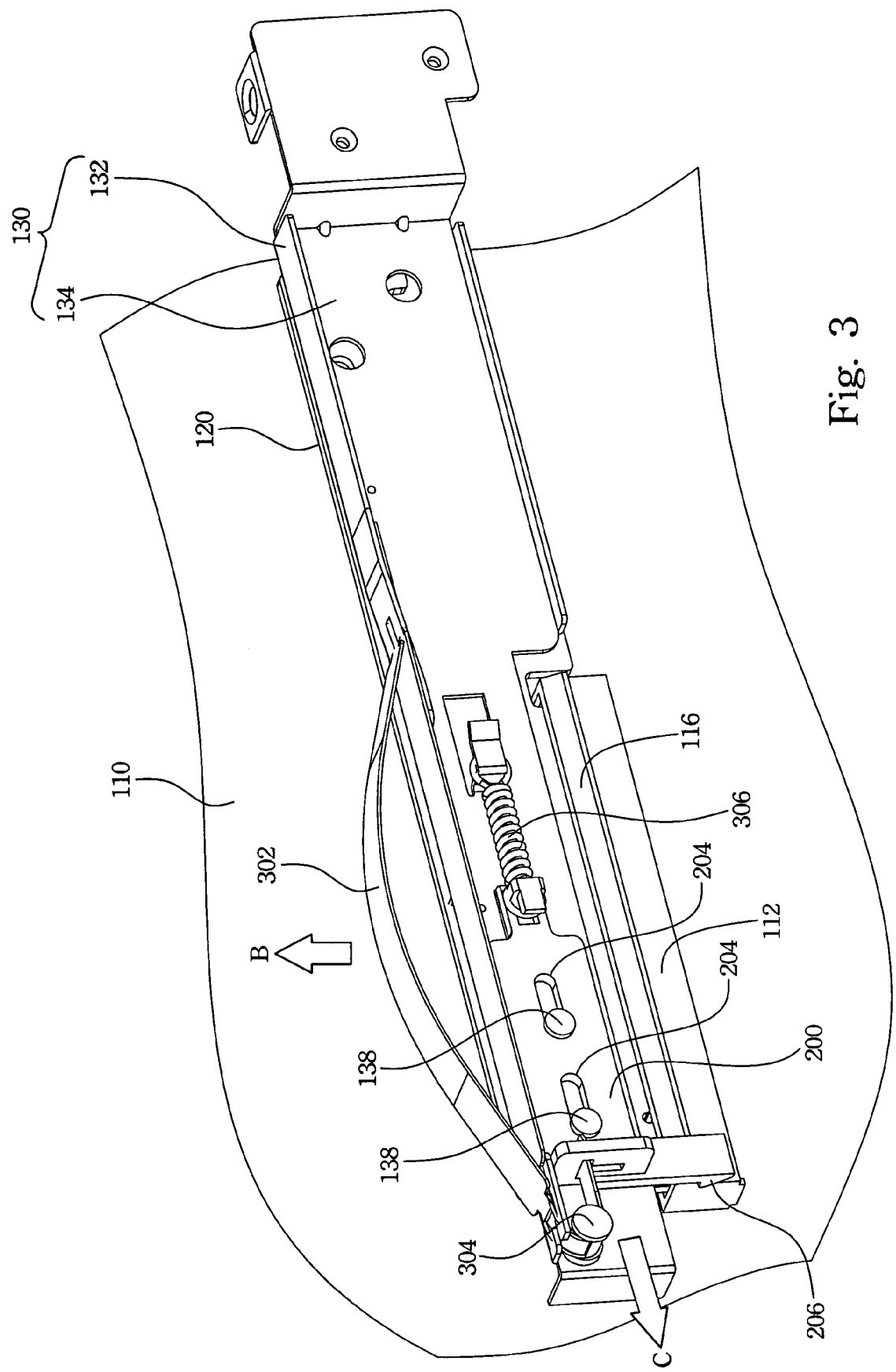
FIG. 3 depicts the second embodiment of the invention.

In order to dismount the riser card module more easily, a flexible force member is arranged in this embodiment. Please refer to FIG. 3. This figure depicts the second embodiment. The flexible force member 302 is arranged on the mounting rack 130. one side of the flexible force member 302 is connected to the top board 132, the other side of the flexible force member is connected to the sliding device 200.

When the flexible force member 302 is pulled towards the direction of arrow B, the flexible force member 302 can tow the sliding device 200 toward the direction of arrow C so that the second hook member 206 is disengaged from the first hook member 116. When the hook member 206 and 116 are not hooked together, the force toward arrow B can dismount the riser card 120 from the slot 112.

The upright board further includes a protrusion 304. The flexible force member 302 is looped around the protrusion 304 and connected to the sliding device 200. Hence, the protrusion 304 can reduce the friction between the flexible force member 302 and the sliding device 200 and increase the life time of the flexible force member 302.

Therefore, when pulling the flexible force member 302, the riser card module 100 can dismount from the server module easily.

In addition, in order to increase the using convenience for returning the initial position of the sliding device, in this embodiment, the riser card module 100 further includes an elastic member 306. One side of the elastic member 306 is connected to the upright board 134, the other side of the elastic member 306 is connected to the sliding device 200. When the flexible force member 302 tows the sliding device 200, the elastic member 306 is extended. When the flexible force member 302 stop tows the sliding device 200, the elastic member 306 will return to its initial formation so that the sliding device 200 will be towed to the initial position. Therefore, the sliding device 200 can automatically return to its initial position and increase the using convenience of the riser card module.

In this embodiment, the flexible force member 302 is a belt. The elastic member 306 is a spring. In other embodiment the flexible force member 302 and the elastic member 306 can change to other devices having the same function as described above.

Third Embodiment

Figure 4:
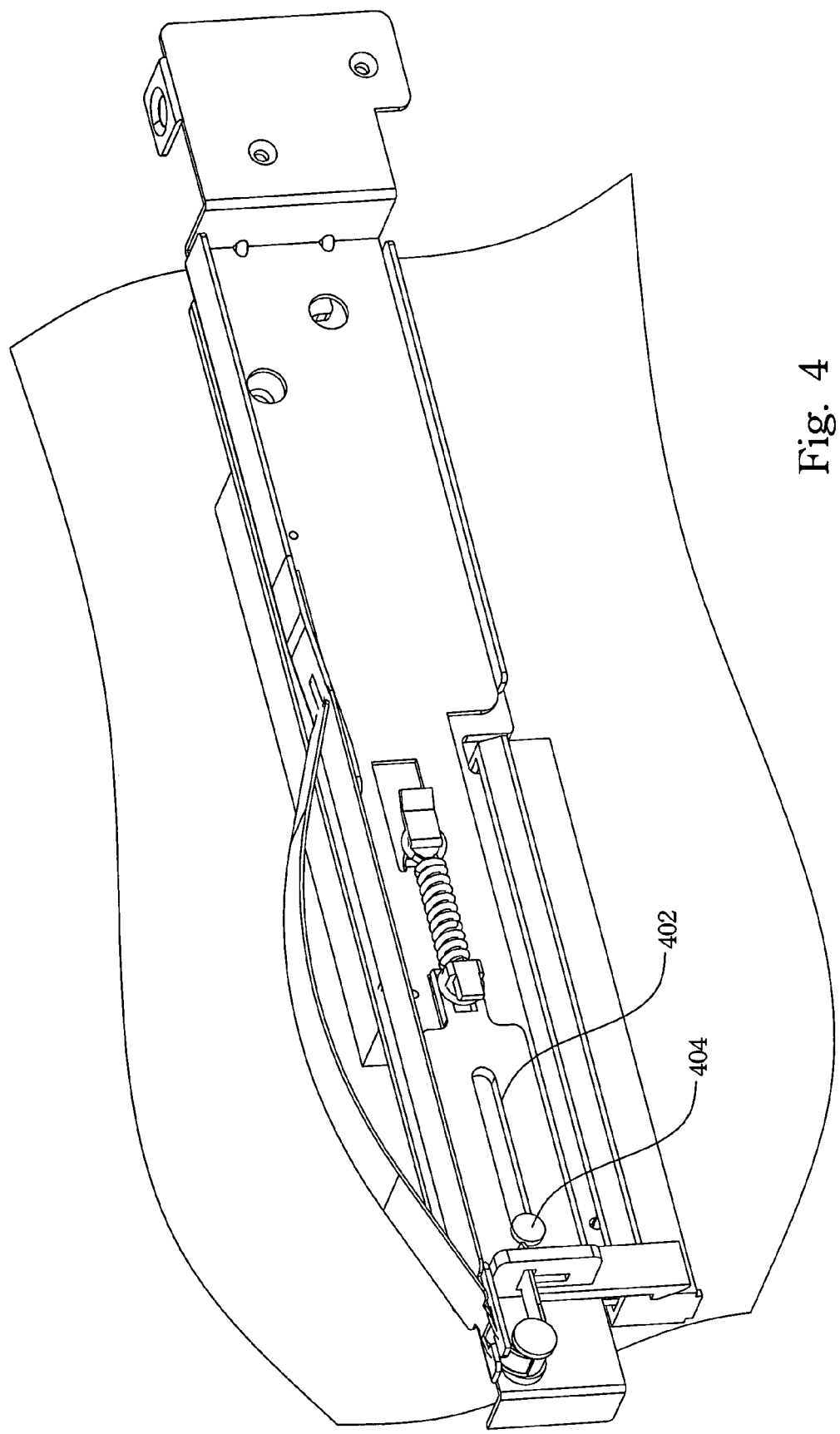
FIG. 4 depicts the third embodiment of the invention.

The design of the elements described above has varied formation. For example, the third embodiment is a different design of the first sliding member and the second sliding member. Please refer to FIG. 4. FIG. 4 depicts the third embodiment.

In other embodiments described above, the first sliding member and the seconding member are two guide pillars and two guide openings. Therefore, the sliding stability of the sliding device is increased. In third embodiment, the first sliding member 402 is a guide pillar, and the second sliding member 404 is a guide opening. Hence, the number of the guide pillar and guide opening can be reduced. Moreover, the cost of the riser card module can be reduced when the sliding stability is acceptable.

Accordingly, the riser card module has the hook member arranged on the sliding device. Hence, the stability of the riser card module is increased. Moreover, the riser card module includes the flexible force member to tow the sliding device. When the hook device disengages, the riser card module dismount from the server module together. In addition, the arrangement of the elastic member can return the sliding device to its initial position automatically and increase the using convenience of the riser card module.

Hence, the embodiments of the present invention can reduce the difficulty of dismounting the riser card module from the main board and increase the stability of the riser card module structure.

Although the present invention has been described in considerable detail with reference t certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A riser card module, installed in a slot of a main board, the slot having a first hook member arranged on the side of the slot, the riser card module comprising:
 a riser card inserted in the slot vertically; and
 a mounting rack connected to the riser card, the mounting rack comprising:
  an upright board mounting the riser card in parallel, the upright board having a first sliding member; and
  a sliding device having a second sliding member and a second hook member, the second sliding member arranged in respect of the first sliding member so that the sliding device slid with respect to the upright board in a direction parallel with the main board, and the second hook member hooked to the first hook member, when the sliding device slides, the second hook member is disengaged from the first hook member.

2. The riser card module of claim 1, wherein the mounting rack further comprises a top board vertically connected to the side of the upright board opposite to the main board.

3. The riser card module of claim 2, wherein the mounting rack further comprises a flexible force member, one side of the flexible force member connected to the top board, the other side of the flexible force member connected to the sliding device.

4. The riser card module of claim 3, wherein the upright board further comprises a protrusion, the flexible force member looped around the protrusion and connected to the sliding device.

5. The riser card module of claim 4, wherein the flexible force member is a belt.

6. The riser card module of claim 1, wherein the mounting rack further comprises an elastic member, one side of the elastic member connected to the upright board, the other side of the elastic member connected to the sliding device.

7. The riser card module of claim 6, wherein the mounting rack further comprises a top board vertically connected to the side of the upright board opposite to the main board.

8. The riser card module of claim 7, wherein the mounting rack further comprises a flexible force member with one side of the flexible force member connected to the top board, the other side of the flexible force member connected to the sliding device.

9. The riser card module of claim 8, wherein the upright board further comprises a protrusion, the flexible force member looped around the protrusion and connected to the sliding device.

10. The riser card module of claim 9, wherein the flexible force member is a belt.

11. The riser card module of claim 6, wherein the elastic member is a spring.

12. The riser card module of claim 1, wherein the first sliding member is a guide pillar.

13. The riser card module of claim 1, wherein the second sliding member is a guide opening.

* * * * *